United States Patent
Eden et al.

(10) Patent No.: US 9,189,095 B2
(45) Date of Patent: Nov. 17, 2015

(54) CALIBRATING EYE TRACKING SYSTEM BY TOUCH INPUT

(71) Applicants: Ibrahim Eden, Kirkland, WA (US); Ruchita Bhargava, Redmond, WA (US)

(72) Inventors: Ibrahim Eden, Kirkland, WA (US); Ruchita Bhargava, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 201 days.

(21) Appl. No.: 13/911,966

(22) Filed: Jun. 6, 2013

(65) Prior Publication Data

US 2014/0361996 A1 Dec. 11, 2014

(51) Int. Cl.
| G06F 3/041 | (2006.01) |
| G06F 3/01 | (2006.01) |
| G06F 3/0488 | (2013.01) |

(52) U.S. Cl.
CPC ............... *G06F 3/041* (2013.01); *G06F 3/013* (2013.01); *G06F 3/0488* (2013.01)

(58) Field of Classification Search
CPC ................. G06F 3/013; G06F 2203/04805
See application file for complete search history.

(56) References Cited

U.S. PATENT DOCUMENTS

| 7,657,062 B2 | 2/2010 | Pilu |
| 2010/0207877 A1 | 8/2010 | Woodard |
| 2011/0141011 A1 | 6/2011 | Lashina et al. |
| 2011/0254865 A1 | 10/2011 | Yee et al. |
| 2011/0310006 A1 | 12/2011 | Edwards et al. |
| 2012/0290401 A1 | 11/2012 | Neven |
| 2012/0320047 A1 | 12/2012 | Yanagita et al. |
| 2013/0145304 A1* | 6/2013 | Deluca et al. ................. 715/781 |
| 2013/0307797 A1* | 11/2013 | Taguchi et al. ............... 345/173 |

FOREIGN PATENT DOCUMENTS

| FR | 2989874 A1 | 11/2013 |
| WO | 2010071928 A1 | 7/2010 |
| WO | 2012052061 A1 | 4/2012 |
| WO | 2012/082971 A1 | 6/2012 |
| WO | 2013059940 A1 | 5/2013 |

OTHER PUBLICATIONS

Zhu, et al., "Eye Gaze Tracking Under Natural Head Movements", Retrieved at <<http://nguyendangbinh.org/Proceedings/CVPR/2005/DATA/11-3P_01.PDF>>, In IEEE Computer Society Conference on Computer Vision and Pattern Recognition, Jun. 20, 2005, pp. 6.

ISA European Patent Office, International Search Report & Written Opinion for PCT/US2014/040583, WIPO, Aug. 7, 2014, 11 Pages.

* cited by examiner

*Primary Examiner* — Van Chow
(74) *Attorney, Agent, or Firm* — Dave Ream; Danielle Johnston-Holmes; Micky Minhas (57) ABSTRACT

Embodiments are disclosed that relate to calibrating an eye tracking system via touch inputs. For example, one disclosed embodiment provides, on a computing system comprising a touch sensitive display and an eye tracking system, a method comprising displaying a user interface on the touch sensitive display, determining a gaze location via the eye tracking system, receiving a touch input at a touch location on the touch sensitive display, and calibrating the eye tracking system based upon an offset between the gaze location and the touch location.

18 Claims, 6 Drawing Sheets

CALIBRATING EYE TRACKING SYSTEM BY TOUCH INPUT

BACKGROUND

Eye tracking may be used in computing systems to detect user inputs made by gaze interactions with displayed user interface objects. Eye tracking systems may utilize images of a user's pupil and corneal reflections from glint light sources to determine a line of sight of the user's eye. However, different users may have anatomical differences that can affect such a determination. For example, the location of the fovea on the retina may differ from person to person. As such, the visual axis of the eye (i.e. the axis extending from the physical object imaged on the user's fovea to the fovea) may be offset from the optical axis of the eye (i.e. the axis extending through the center of the pupil to the back pole of the eyeball). As the image data is used to determine an estimate of the optical axis of the eye, such an offset may complicate the accurate estimate of an actual location at which the user is gazing.

SUMMARY

Embodiments are disclosed that relate to calibrating an eye tracking system via touch inputs. For example, one disclosed embodiment provides, on a computing system comprising a touch sensitive display and an eye tracking system, a method comprising displaying a user interface on the touch sensitive display, determining a gaze location via the eye tracking system, receiving a touch input at a touch location on the touch sensitive display, and calibrating the eye tracking system based upon an offset between the gaze location and the touch location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
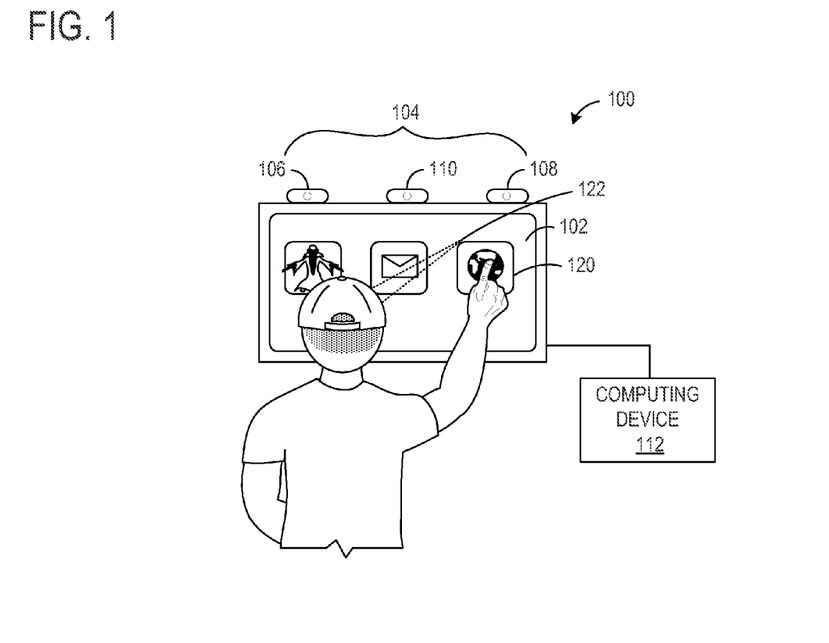
FIG. 1 shows an embodiment of a computing system comprising an eye tracking system and a touch sensitive display.

As mentioned above, eye tracking may be used as a user input mechanism for a computing system. Various types of computing systems may utilize eye tracking for receiving user inputs. FIG. 1 depicts an example embodiment of a computing system 100 as comprising a touch sensitive display 102 and an eye tracking system 104 configured to determine a location at which the user's gaze intersects the display 102. The depicted eye tracking system 104 comprises a stereo pair of image sensors 106, 108, and also a glint light source 110 including one or more light sources configured to direct light toward the user's eye. Image sensors 106 may capture images of a user's eye while the glint lights are illuminated, and positions of the user's pupil and glint reflections from the user's cornea as detected from the image data may be used to determine a direction of gaze. Further, images from the stereo pair of image sensors 106, 108 may be used to determine a distance from the user's eye to the display 102. From this information, the computing system 100 may determine a location at which the user's gaze intersects the display 102. The location may then be provided to a computing device 112 as a user input for a graphical user interface.

While the depicted touch sensitive display 102 and eye tracking system 104 are shown as being at a fixed environmental location relative to a user, it will be understood that the computing system may have any other suitable configuration. For example, the computing system may take the form of a mobile computing system, such as a smart phone, tablet computer, laptop computer, and/or wearable computing system.

Figure 2:
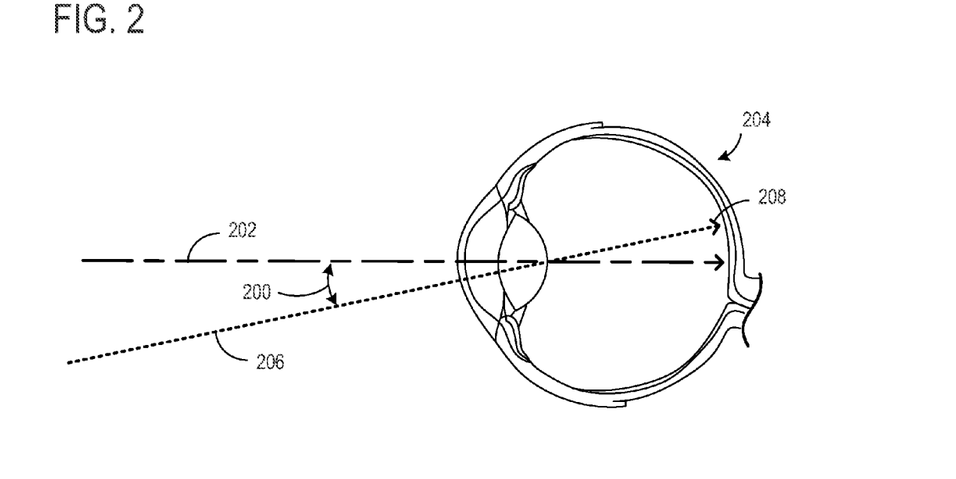
FIG. 2 shows a schematic diagram illustrating an offset between an optical axis and a visual axis of a human eye.

As mentioned above, anatomical differences between users, including but not limited to the location of the fovea on the retina, may pose difficulties in accurately estimating an actual location of the user's gaze. FIG. 2 illustrates an example offset 200 between an optical axis 202 of an eye 204 and a visual axis 206 of eye 204. Optical axis 202 extends through the center of the pupil to the back pole of the eyeball, while visual axis 206 extends from an object being viewed to the image of the object on fovea 208 of eye 204. In some individuals, such an offset may be on the order of five degrees or greater.

An estimate of optical axis 202 may be detected from image data capturing images of the pupil and corneal glint reflections. However, depending upon the degree of offset between the visual and optical axes of a user, a user may have difficulty interacting with a graphical user interface via gaze, as the user's actual gaze location may not match the position signal generated by the eye tracking system.

As such, to help estimate gaze location more accurately, the eye tracking system may be calibrated to determine a correction to be applied to correct for differences between the visual and optical axes of users. Current calibration processes may utilize a dedicated process performed at the start of each system use session, and also whenever a user's head moves beyond a threshold distance from an original location at which the system was calibrated. Thus, due to the need to hold the head steady or recalibrate, current eye tracking systems may be difficult to use in consumer settings.

Computing devices increasingly utilize touch sensitive displays as input devices. Already ubiquitous on mobile devices, touch sensitive displays are also finding more use in desktop, laptop, and large format display settings. On computing systems comprising a touch sensitive display, users may interact with the touch sensitive display relatively frequently. Further, many touch interactions may indicate a location that the user's gaze and the touch input intersect. Thus, embodiments are disclosed that utilize inputs received via a touch sensitive display to calibrate an eye tracking system by comparing a location of touch to a location determined by a gaze tracking system, and calibrating the eye tracking system based upon an offset between the locations. It is noted that such calibration may be performed as a background process during ordinary use of a computing system comprising a touch sensitive display and an eye tracking system. This may allow a calibration to be performed and updated continuously without interrupting a user experience.

As described in more detail below, not all types of touch inputs may correspond to locations where a user's gaze intersects a touch input. For example, if a touch input is a scrolling gesture, then it may be likely that the user is not actually gazing at the location of touch, but instead is gazing at the content being scrolled. Likewise, multi-touch gestures such as pinch/stretch gestures also may not correspond to gaze locations.

Figure 3:
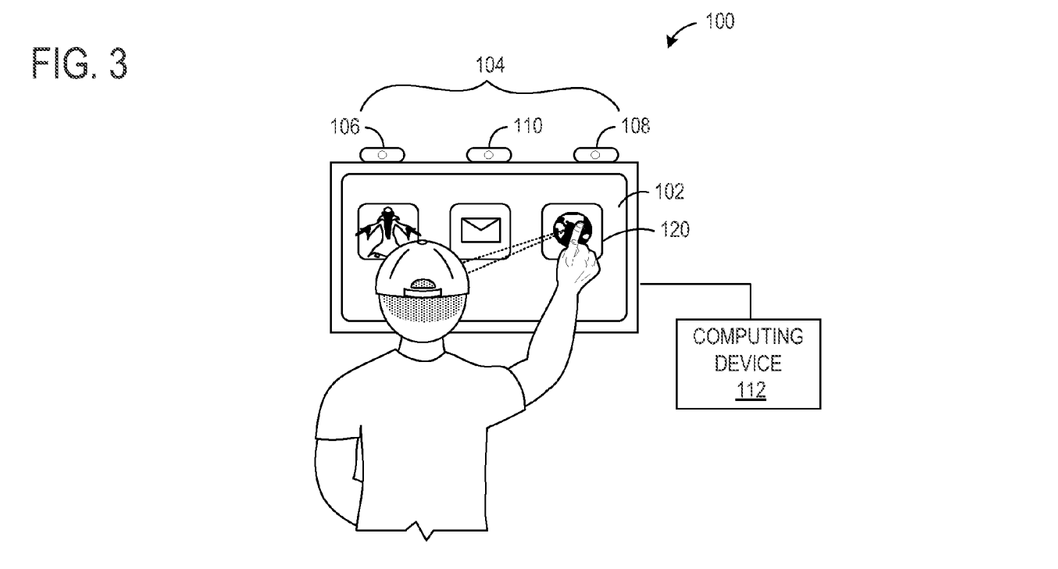
FIG. 3 shows the computing system of FIG. 1 after calibration of the eye tracking system.

In contrast, other touch inputs, such as single touch inputs selecting stationary user interface elements, may provide more reliable information regarding location of a user's gaze. For example, FIG. 1 shows a user making a touch input over an icon 120 displayed on the touch sensitive display 102. As can be seen, the touch input is a single touch, and is over a stationary user interface element (i.e. icon 120) that is well spaced from other user interface elements. Further, the user's determined gaze location 122 is close to, but not at, icon 120. As such, the computing system may determine from this information that the touch input and actual gaze location (as opposed to the detected gaze location) are likely to intersect at the display in this instance, and accordingly determine a correction to apply to the eye tracking determination based upon the offset of the gaze location from the touch location. FIG. 3 shows the determined gaze location after performing calibration based upon the touch input. As can be seen, the applied correction results in the intersection of the touch input and determined gaze location on the display 102.

In some embodiments, a computing device may utilize all received touch inputs to perform calibration, with the assumption that a sufficiently high percentage of touch inputs intersect with an actual gaze location to achieve a reasonably accurate calibration. Such embodiments may at times perform an inaccurate calibration when a touch input does not actually correspond to a gaze location, but such errors may be corrected during subsequent touch inputs. Further, in such embodiments, gaze input offsets may be averaged over some time frame to reduce the effect of any inaccurate data points.

In other embodiments, a computing device may first determine whether a touch input may be a reliable indicator of gaze location before performing a calibration based upon the touch input. For example, in some embodiments, the computing device may utilize touches within a threshold distance of a determined gaze location, based upon the assumption that touches outside of the threshold distance may correspond to user inputs (e.g. scrolling gestures) that are not reliable indicators of gaze locations. Such a threshold distance may be context-dependent (e.g. the threshold distance may be smaller in contexts where user interface elements are closer together). Other contextual filters may be similarly applied.

Further, in some embodiments, a computing device may use a trained classification algorithm to classify touch inputs. Such a classification algorithm may be trained utilizing touch inputs and gaze tracking performed under a potentially wide variety of combinations of known contextual conditions. The use of such a classification function may help to identify potentially relevant touch inputs more reliably than other methods, and therefore may help to reduce noise over time as the calibration is updated.

Any suitable information may be used in training a classification function. Likewise, any suitable information may be used as an input into such a classification function when classifying a touch input. As one example, a context of a current task may be determined and utilized. For example, touches made by a user while scrolling in a newspaper reading application may not be useful for gaze tracking calibration, whereas data obtained from a painting application may be useful. Likewise, touches made by a user while typing on a software keyboard displayed on a touch sensitive display may be useful for calibration, as the lack of physical feedback enforces most users to look at the key being selected. Further, a number of touch points also may be utilized as information for touch classification, as single touch inputs may be more reliable indicators of gaze location than multi-touch inputs.

Additionally, touch patterns may be utilized as contextual information for classification. As a more specific example, periodic touch patterns, such as scrolling gestures, may indicate that a user is not paying attention to the touched location, but is instead likely paying attention to the content being scrolled. Likewise, correlations between touch inputs/movements and relative gaze locations/movements may be utilized, as even where calibration is not correctly established, such relative movements may provide a good indication of a reliability of a touch input for use in correlating a gaze tracking system. Further, historical touch and gaze data may be tracked for specific users, and such historical touch data may then be used to classify future touch inputs of that user. This may be helpful in identifying user-specific types of inputs, as different users may have different and/or characteristic touch input behaviors. It will be understood that these examples of information that may be used in classification are presented for the purpose of illustration and are not intended to be limiting in any manner, as any other suitable information may be used.

Figure 4:
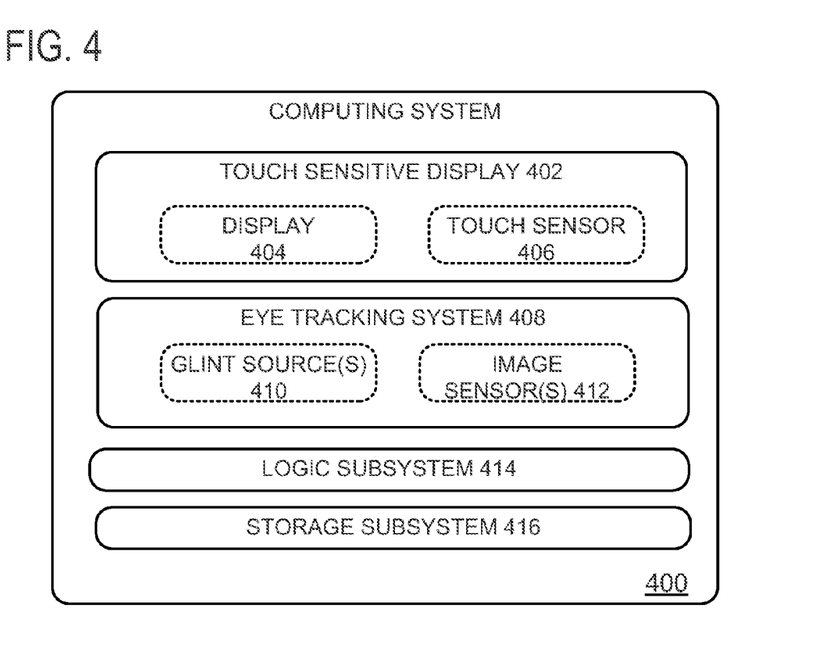
FIG. 4 shows a block diagram of an embodiment of a computing system comprising an eye tracking system and a touch sensitive display.

Touch inputs may be used to calibrate an eye tracking system in any suitable hardware environment. FIG. 4 shows a block diagram depicting an example embodiment of a computing system 400 comprising a touch sensitive display 402 and an eye tracking system 408. The touch sensitive display comprises a display 404 and a touch sensor 406. Any suitable touch sensor may be used to detect touch. Examples include, but are not limited to, optical, capacitive, and resistive sensors. Likewise, the computing system 400 may take any suitable form. Examples include, but are not limited to, desktop, laptop, mobile, and wearable computing systems, home entertainment consoles, televisions, etc.

The eye tracking system 408 is configured to determine a location at which a user's gaze intersects the display 404, and to output a position signal based upon the determination. The eye tracking system 408 may track a user's gaze in any suitable manner. For example, in some embodiments, the eye tracking system 408 may utilize one or more glint light sources 410 configured to create glint reflections from the cornea of an eye, and one or more image sensors configured to acquire an image of the eye. A gaze direction may be determined from relative locations of the pupil of the eye and glints from the light sources. The gaze direction may be used, along with information regarding a distance from a user's eye to the display, to determine a location at which the gaze intersects the display. Such distance information may be based upon a predetermined estimate or calibration, or upon real-time depth information (e.g. from a stereo camera configuration), or any other method for measuring the distance between the user's eyes and the display device. It will be appreciated that the disclosed embodiments of calibrating an eye tracking system may be used with any other suitable eye tracking system, including eye tracking systems that are not glint-based.

The computing system 400 also includes a logic subsystem 414, and a storage subsystem 416. The storage subsystem 416 may include stored instructions executable by the logic subsystem 414 to perform various tasks related to presenting a graphical user interface and receiving and processing eye tracking information and touch input information, for example, to calibrate an eye tracking system. Example computing systems are described in more detail below.

Figure 5:
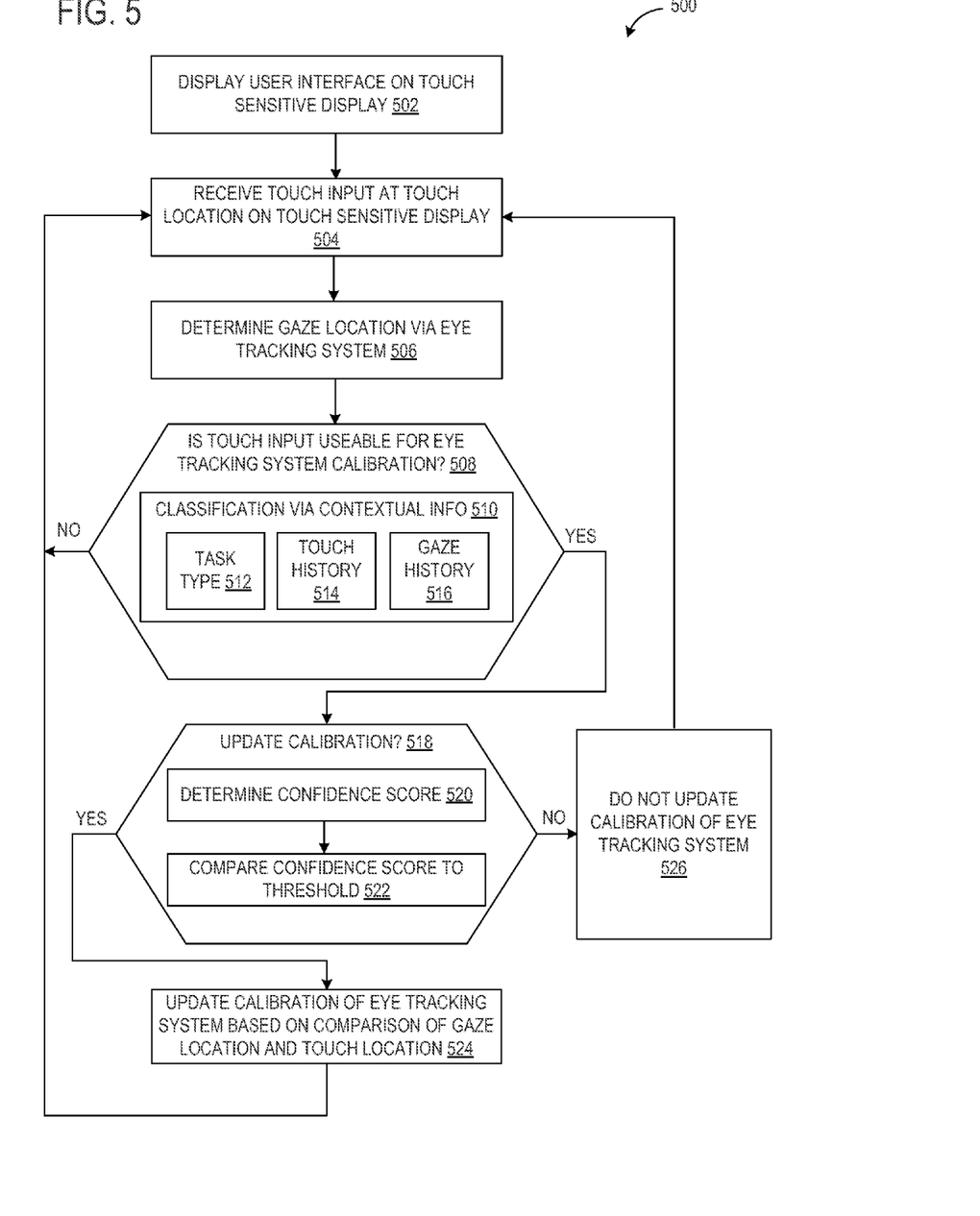
FIG. 5 shows a flow diagram depicting an example embodiment of a method for calibrating an eye tracking system.

FIG. 5 shows a flow diagram depicting an embodiment of a method for calibrating an eye tracking system based upon touch inputs. Method 500 comprises, at 502, displaying a user interface on a touch sensitive display. The user interface may comprise any suitable information with which a user may interact via touch and/or gaze. Examples include, but are not limited to, icons selectable by touch and/or gaze and application windows in which a user may take actions via touch or gaze (e.g. a paint program, office productivity program, desktop display, etc.). As such, the displayed user interface may be unrelated to the calibration of the eye tracking system. However, it will be understood that the user interface also may comprise a dedicated eye tracking system calibration user interface in some examples.

Method 500 further comprises, at 504, receiving a touch input at a location on the touch sensitive display, and at 506, determining a gaze location (e.g. a location at which a line of sight of a user intersects the touch sensitive display). It will be understood the gaze location may be determined on a periodic basis at a preselected update frequency, and that touch input locations may be determined whenever a touch input is detected via the touch sensor.

Method 500 further comprises, at 508, determining whether a touch input is useable for eye tracking system calibration. For example, as described above and as indicated at 510, in some embodiments each received touch input may be classified by a classification function that utilizes various contextual information to determine whether the touch input is likely to be indicative of a gaze location. Any suitable contextual information may be used to classify touch inputs via such a function. Examples include, but are not limited to, a task definition 512 (e.g. an identity of a service or application with which the user is interacting, an identity of a user interface element at the touch location, etc.), a touch history 514 (e.g. whether the touch is a gesture or a stationary touch, whether the touch is a single touch or part of a multi-touch input, whether a touch input matches a characteristic or historic touch input pattern of a specific user), and a gaze history 516 (e.g. whether changes in the gaze location over a time interval correlate with changes in the touch location over the time interval).

In other embodiments, any other suitable method than a classification function may be used to determine whether to use a detected touch input for calibration. For example, one or more contextual filters may be applied to identify touch inputs that may correspond to gaze locations. Additionally, in yet other embodiments, all detected touch inputs may be used for calibration, and other methods (e.g. averaging) may be used to mitigate any impact from touch inputs that do not correlate to gaze locations.

If the touch input is determined not to be useable for calibration, then method 500 returns to 504 to wait for another touch input. On the other hand, if the touch input is determined to be useable for calibration, then method 500 comprises, at 518, determining whether to update the eye tracking system calibration with the touch input. Any suitable method may be used to determine whether to perform calibration based upon a touch input that has been determined to be likely to indicate a gaze location. For example, as indicated at 520, a confidence score may be determined regarding how well the gaze system calibration currently represents the relationship between touch signals and gaze locations, and at 522, the confidence score may be compared to a threshold condition. In such embodiments, calibration may be performed if the threshold condition is met (e.g. the confidence score is above or below a threshold score, depending upon how the score is determined). The confidence score may be determined based upon any suitable information, including but not limited to a determined offset between the gaze location and touch location, as well as contextual information such as that described above with regard to process 510. For example, the confidence score may vary depending upon a density of user interface elements in an area in which the touch input and/or gaze were detected.

Determining whether to update calibration after identifying a touch suitable for calibration may help to preserve computing resources compared to updating calibration with each determined suitable touch input. However, in other embodiments, calibration updating may be performed with each suitable touch input.

If it is determined at 518 not to perform calculation, then method 500 comprises not calibrating the eye tracking system at 526. Method 500 then returns to 504 to wait for further touch inputs. On the other hand, if it is determined at 518 to perform calibration, then method 500 comprises, at 524, updating a calibration of the eye tracking system based upon a comparison of the gaze location and the touch location. Calibration may be performed in any suitable manner. For example, in some embodiments, calibration may be performed by determining calibration parameters for the eye tracking system that would minimize a distance (based upon a pre-defined metric) between projected gaze rays to the touch surface and corresponding touch locations.

As mentioned above, touch inputs received in some contexts may be more indicative of gaze location than touch inputs received in other contexts. For example, touch inputs received during a login process potentially may be highly indicative of gaze location, as successfully logging involves careful selection of touch location. A computing device may utilize various types of login processes in combination with a touch sensitive display. For example, some computing devices may utilize a virtual keyboard displayed on the touch sensitive display for entry of an alphanumeric password. Further, some computing devices may utilize a picture password represented by a series of touch inputs made over a displayed picture.

Figure 6:
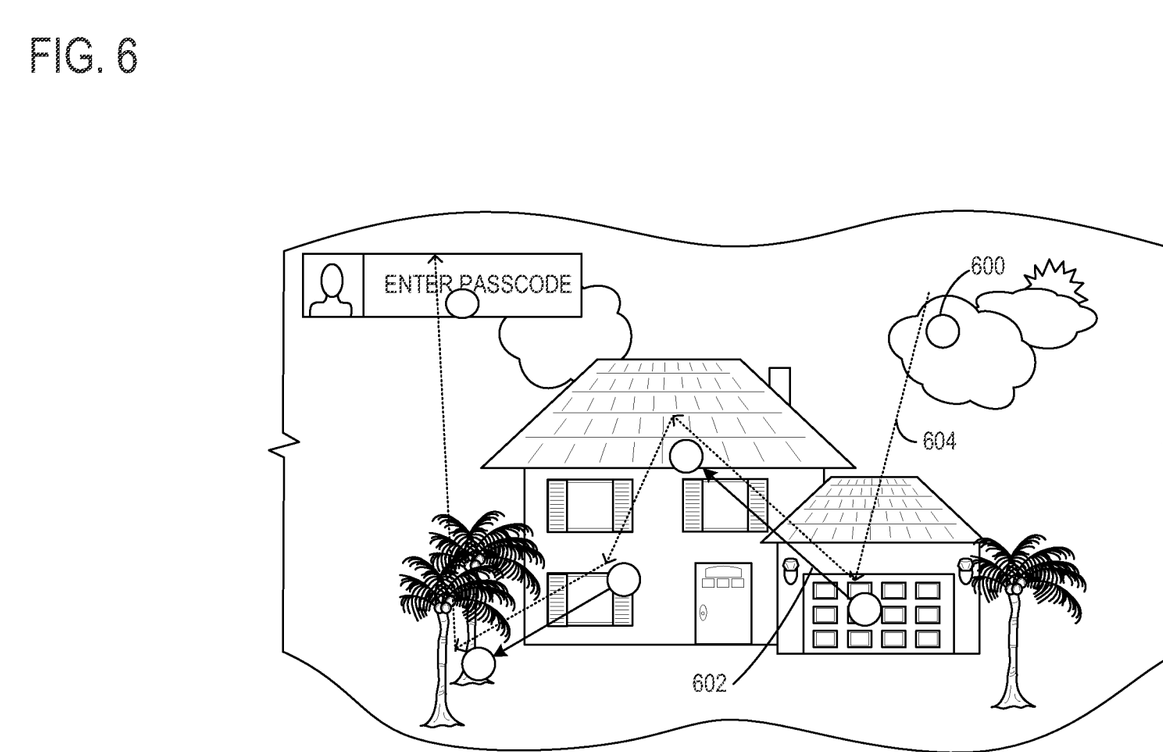
FIG. 6 shows an example embodiment of a picture password login process, and illustrates a received touch path and a determined gaze path.

FIG. 6 shows an example embodiment of a picture password in the form of a series of touches and touch gestures made over a displayed picture, and also illustrates a gaze path detected during entry of the picture password. Touch inputs are represented by circles 600, and touch gestures are represented by solid arrows 602 extending between circles 600. Further, a detected gaze path 604 is represented by a dashed line.

As can be seen, the detected gaze path 604 is highly correlated to the detected touch inputs. However, the detected gaze path 604 is spatially offset from each corresponding touch input. As such, a calibration to be applied to the eye tracking system may be determined from this spatial offset. While depicted as a picture password, it will be understood that such an offset also may be determined via text entry performed via a software keyboard displayed on a touch sensitive display.

Figure 7:
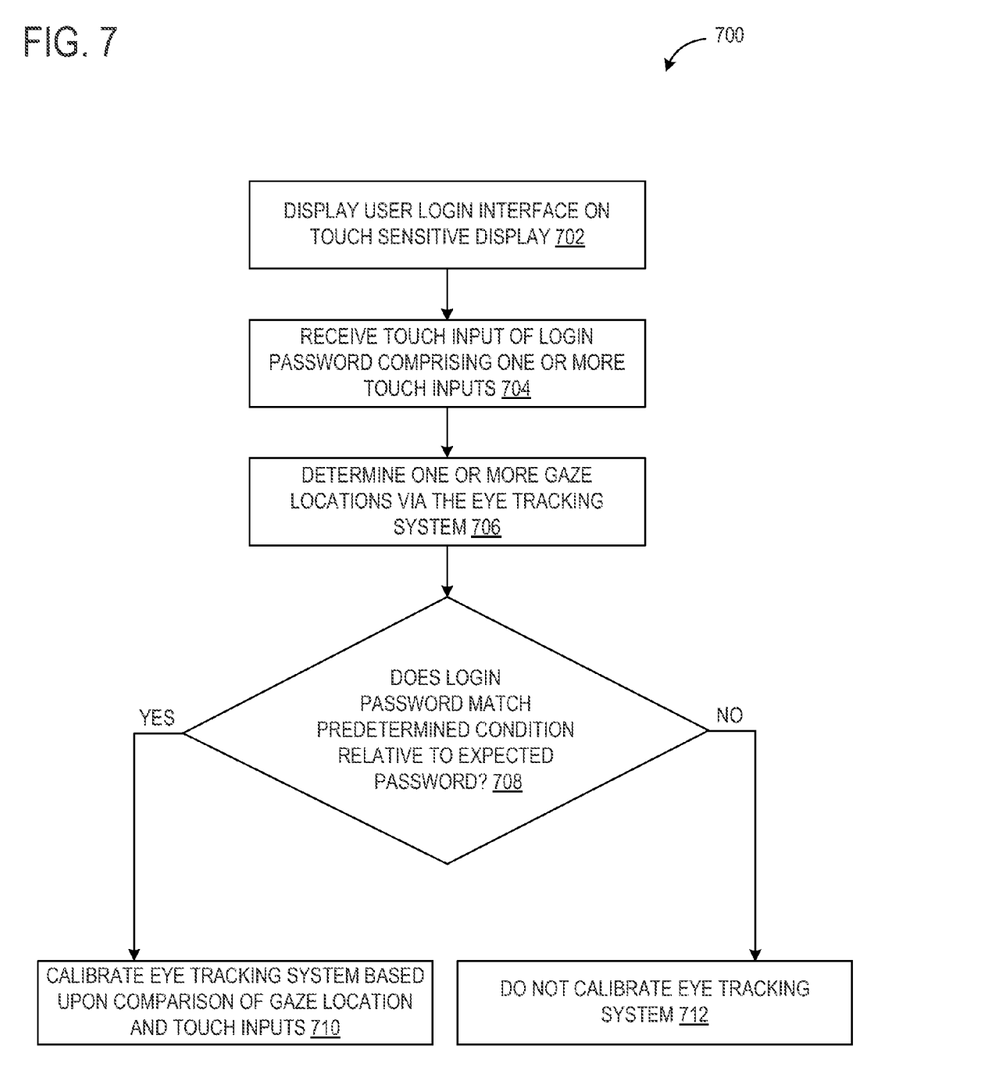
FIG. 7 shows a flow diagram depicting an example embodiment of another method for calibrating an eye tracking system.

FIG. 7 shows a flow diagram depicting an embodiment of a method 700 of calibrating an eye tracking system via touch inputs and gaze locations detected during a login process. Method 700 comprises, at 702, displaying a login user interface on a touch sensitive display. As mentioned above, the login user interface may display a software keyboard, a picture login user interface, and/or any other suitable login user interface where the user's touch intersects with her/his gaze. Method 700 further comprises, at 704, receiving a touch input of a login password comprising one or more touch inputs, and at 706, determining one or more gaze locations via an eye tracking system. Next, at 708, method 700 comprises determining whether the login password matches a predetermined condition relative to an expected password. As examples, it may be determined whether a correct alphanumeric sequence was entered, and/or whether a sequence of touch gestures entered in a picture password login process match an expected series of gestures (e.g. within a selected tolerance). If the login password matches the predetermined condition relative to the expected password, then method 700 comprises, at 710, calibrating the eye tracking system based upon comparing the detected touch inputs and detected gaze locations to reduce the offset between the determined gaze locations and touch inputs. On the other hand, if the login password does not match the predetermined condition relative to the expected password, then method 700 comprises, at 712, not calibrating the eye tracking system, and also may comprise not logging in the user.

Calibrating an eye tracking system during a login process may allow the eye tracking system to be calibrated and ready for use once the user logs in. Further, after logging in, calibration may be maintained based upon comparisons between suitable touch inputs and gaze locations performed as background processes, as described above. As such, a user may utilize an eye tracking system without performing conventional, time-consuming calibration processes.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
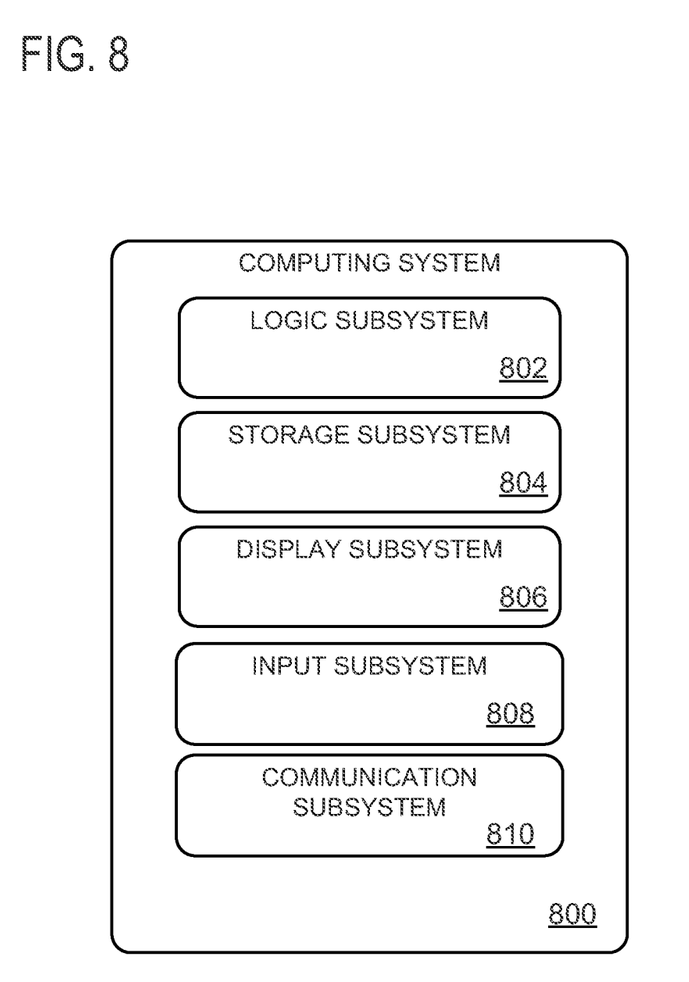
FIG. 8 shows a block diagram of an embodiment of a computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic subsystem 802 and a storage subsystem 804. Computing system 800 further includes a display subsystem 806, input subsystem 808, communication subsystem 810, and/or other components not shown in FIG. 8.

Logic subsystem 802 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 804 includes one or more physical devices configured to hold instructions executable by the logic subsystem to implement the methods and processes described herein. When such methods and processes are implemented, the state of storage subsystem 804 may be transformed—e.g., to hold different data.

Storage subsystem 804 may include removable and/or built-in devices. Storage subsystem 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices.

It will be appreciated that storage subsystem 804 includes one or more physical devices and excludes signals per se. However, aspects of the instructions described herein alternatively may be propagated by a communication medium (e.g., an electromagnetic signal, an optical signal, etc.) that is not stored by a physical device.

Aspects of logic subsystem 802 and storage subsystem 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 800 implemented to perform a particular function. In some cases, a program may be instantiated via logic subsystem 802 executing instructions held by storage subsystem 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

Display subsystem 806 may be used to present a visual representation of data held by storage subsystem 804. This visual representation may take the form of a graphical user interface (GUI) with which a user may interact via various input systems, including but not limited to eye tracking systems and touch sensing systems. As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

Input subsystem 808 may comprise or interface with one or more user-input devices such as a keyboard, mouse, touch screen, or game controller. The input subsystem further may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

Communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing system comprising a touch sensitive display and an eye tracking system, a method of calibrating the eye tracking system, the method comprising:
    displaying a user interface on the touch sensitive display;
    receiving a touch input at a touch location on the touch sensitive display;
    determining a gaze location via the eye tracking system;
    classifying the touch input based on contextual information comprising information regarding the user interface being displayed; and
    if the touch input is determined to be a touch input useable for eye tracking system calibration based upon the contextual information, then calibrating the eye tracking system based upon an offset between the gaze location and the touch location.

2. The method of claim 1, further comprising,
    if the touch input is determined not to be a touch input useable for eye tracking system calibration, then not calibrating the eye tracking system.

3. The method of claim 1, further comprising utilizing a classification function to classify the touch input.

4. The method of claim 3, wherein utilizing a classification function comprises utilizing contextual information regarding the touch input to classify the touch input.

5. The method of claim 2, further comprising not calibrating the eye tracking system if the touch input is a scrolling gesture.

6. The method of claim 2, further comprising not calibrating the eye tracking system if the touch input is a part of a multi-touch input.

7. The method of claim 1, further comprising calibrating the eye tracking system if the touch input is part of a login process.

8. The method of claim 1, wherein calibrating the eye tracking system is performed as a background process.

9. The method of claim 1, further comprising comparing the gaze location and the touch location to determine a confidence score, comparing the confidence score to a threshold condition, and calibrating the eye tracking system if the confidence score meets the threshold condition.

10. A computing system, comprising:
    a touch sensitive display;
    an eye tracking system;
    a logic subsystem configured to execute instructions; and
    a storage subsystem comprising instructions executable by the logic subsystem to
        display a user interface on the touch sensitive display;
        receive a touch input at a touch location on the touch sensitive display;
        determine a gaze location via the eye tracking system;
        classify the touch input based on contextual information comprising user-specific historical touch and gaze data;
        determine whether the touch input is a touch input useable for eye tracking system calibration based on classification of the touch input;
        if the touch input is determined to be a touch input useable for eye tracking system calibration, then compare the gaze location and the touch location to calibrate the eye tracking system; and
        if the touch system is determined not to be a touch input useable for eye tracking system calibration, then not compare the gaze location and the touch location to calibrate the eye tracking system.

11. The computing system of claim 10, wherein the instructions executable to determine whether the touch input is a touch input useable for eye tracking system calibration comprises instructions executable to utilize a classification function to classify the touch input.

12. The computing system of claim 11, wherein the instructions executable to determine whether the touch input is a touch input useable for eye tracking system calibration comprises instructions executable to apply a contextual filter.

13. The computing system of claim 10, wherein the instructions are executable not to calibrate the eye tracking system if the touch input is a scrolling gesture.

14. The computing system of claim 10, wherein the instructions are executable not to calibrate the eye tracking system if the touch input is part of a multi-touch input.

15. The computing system of claim 10, wherein the instructions are executable to calibrate the eye tracking system if the touch input is part of a login process.

16. The computing system of claim 10, wherein the instructions are executable to calibrate the eye tracking system as a background process.

17. On a computing system comprising a touch sensitive display and an eye tracking system, a method of calibrating the eye tracking system, the method comprising:
- displaying a login user interface on the touch sensitive display;
- receiving a touch input of a login password, the login password comprising one or more touch inputs on the touch sensitive display;
- determining one or more gaze locations via the eye tracking system;
- determining whether the login password matches a predetermined condition relative to an expected password;
- if the login password matches the predetermined condition relative to the expected password, then calibrating the eye tracking system based upon comparing the gaze location and the one or more touch inputs; and
- if the login password does not match the predetermined condition relative to the expected password, then not calibrating the eye tracking system.

18. The method of claim 17, wherein calibrating the eye tracking system comprises calibrating the eye tracking system based upon an offset between the one or more gaze locations and the one or more touch inputs.

\* \* \* \* \*